United States Patent
Nishi

(10) Patent No.: US 8,537,947 B2
(45) Date of Patent: Sep. 17, 2013

(54) OVERSAMPLING CIRCUIT, SERIAL COMMUNICATION APPARATUS AND OVERSAMPLING METHOD

(75) Inventor: Ryohsuke Nishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 217 days.

(21) Appl. No.: 13/276,603

(22) Filed: Oct. 19, 2011

(65) Prior Publication Data

US 2012/0099688 A1   Apr. 26, 2012

(30) Foreign Application Priority Data

Oct. 25, 2010  (JP) .................. 2010-238541
May 30, 2011  (JP) .................. 2011-120211

(51) Int. Cl.
*H04L 7/00* (2006.01)

(52) U.S. Cl.
USPC .......................................... 375/355

(58) Field of Classification Search
USPC ............... 375/355, 371; 370/516, 537–538, 370/366

See application file for complete search history.

(56) References Cited

U.S. PATENT DOCUMENTS

| 7,630,467 | B2 * | 12/2009 | Vallet ............................. 375/371 |
| 7,684,531 | B2 * | 3/2010 | Masui et al. .................. 375/355 |
| 7,782,990 | B1 * | 8/2010 | Snow ............................ 375/355 |
| 2005/0135527 | A1 | 6/2005 | Masui et al. |
| 2008/0056420 | A1 | 3/2008 | Tsukamoto et al. |

FOREIGN PATENT DOCUMENTS

| EP | 1 009 125 A2 * | 6/2000 |
| JP | 2005-192192 | 7/2005 |
| JP | 2008-066879 | 3/2008 |
| JP | 2009-219021 | 9/2009 |
| JP | 2010-016545 | 1/2010 |

* cited by examiner

*Primary Examiner* — Jean B Corrielus
(74) *Attorney, Agent, or Firm* — IPUSA, PLLC

(57) ABSTRACT

An oversampling circuit includes: a generation unit configured to generate multiphase serial data by delaying serial data by a predetermined time; and an oversampling unit configured to oversample the multiphase serial data by using multiphase clocks, wherein a phase difference of the multiphase serial data is set to be a sum of an oversampling interval used in the oversampling circuit and an integral multiple of a phase difference of the multiphase clocks.

7 Claims, 18 Drawing Sheets

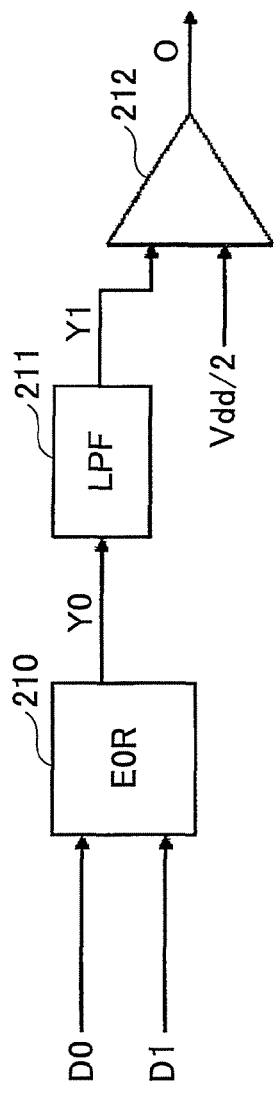
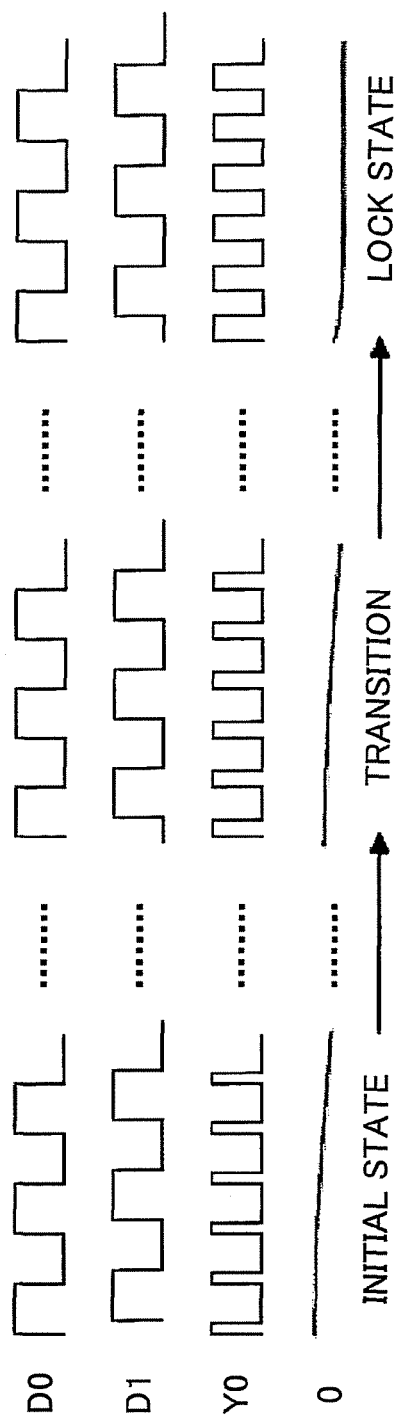
FIG.12A
FIG.12B

FIG.14

| DATA RATE [GB/s] | 1UI [ps] | OVERSAMPLING NUMBER | OVERSAMPLING INTERVAL [ps] | OVERSAMPLING CLOCK PHASE DIFFERENCE [ps] | MULTIPHASE SERIAL DATA PHASE DIFFERENCE [ps] |
|---|---|---|---|---|---|
| 2.5 | 400 | 8 | 50 | 100 | 150 |
| 5 | 200 | 8 | 25 | 100 | 125 |
| 10 | 100 | 8 | 12.5 | 100 | 112.5 |

FIG.15

| NUMBER OF PASSED STAGES OF DELAY ELEMENTS | MULTIPHASE SERIAL DATA PHASE DIFFERENCE | | |
|---|---|---|---|
| | LOCK PHASE OF DELAY ELEMENT 150ps | LOCK PHASE OF DELAY ELEMENT 125ps | LOCK PHASE OF DELAY ELEMENT 112.5ps |
| 1 | 150 | 125 | 112.5 |
| 2 | 300 | 250 | 225 |
| 3 | 50 | 375 | 337.5 |
| 4 | 200 | 100 | 50 |
| 5 | 350 | 225 | 162.5 |
| 6 | 100 | 350 | 275 |
| 7 | 250 | 75 | 387.5 |
| 8 | 0 | 200 | 100 |

FIG.16

| DATA RATE [Gbps] | LOWER LIMIT OF DELAY AMOUNT OF DATA DELAY ELEMENT [ps] | UPPER LIMIT OF DELAY AMOUNT OF DATA DELAY ELEMENT [ps] |
|---|---|---|
| 2.5 | 116.7 | 150 |
| 5 | 75 | 125 |
| 10 | 87.5 | 112.5 |

OVERSAMPLING CIRCUIT, SERIAL COMMUNICATION APPARATUS AND OVERSAMPLING METHOD

CROSS-REFERENCE TO RELATED APPLICATIONS

This application claims the benefit of a Japanese Patent Application No. 2010-238541 filed on Oct. 25, 2010, in the Japanese Patent Office, the disclosure of which is hereby incorporated by reference. Also, this application claims the benefit of a Japanese Patent Application No. 2011-120211 filed on May 30, 2011, in the Japanese Patent Office, the disclosure of which is hereby incorporated by reference.

BACKGROUND OF THE INVENTION

1. Field of the Invention

The present invention relates to an oversampling circuit, a serial communication apparatus using the oversampling circuit, and an oversampling method.

2. Description of the Related Art

Many high-speed interface standards are becoming commercially practical in order to satisfy large-capacity and high-speed data transmission. For most of them, a serial transmission scheme is adopted. In the serial transmission scheme, data is transmitted based on a predetermined frequency. A clock of the frequency is superimposed on data to be transmitted. A data receiving unit extracts the clock from the received signal, and restores received data based on the extracted clock signal. The circuit for performing the restoration operation is called a clock data recovery (to be referred to as CDR hereinafter) circuit, for example.

In a conventional CDR circuit, generally, a PLL (Phase Locked Loop) circuit is used, in which an oscillation clock of a VCO (Voltage Controlled Oscillator) in the PLL circuit is controlled such that the oscillation clock synchronizes with the phase of the received data, and the oscillation clock is extracted as a restored clock. Then, by latching the received data on the basis of the restored clock, the received data is restored accurately.

However, due to increase of the data rate, the oscillation frequency of the VCO also increases. As to a CDR circuit embedding such a VCO, there are disadvantages such as increase of chip size, increase of consumption current, and increase of cost. Also, wiring delay cannot be neglected due to speed-up. Since element arrangement and wiring delay largely depend on characteristics of devices to be used, it becomes necessary to redesign the layout in each process, so that re-usability of the circuits is lowered and the development period increases.

For solving the problems, an oversampling type CDR circuit is proposed (refer to Japanese Laid-Open Patent Application No. 2005-192192 (patent document 1), for example). The oversampling type CDR circuit generates multiphase clocks in which phases are shifted at equal intervals based on a reference clock, so that input data is sampled by each phase to obtain oversampling data. The oversampling type CDR circuit detects timing at which the logic is reversed from the bit sequence of the oversampling data, and restores the clock and the data based on the result. By adopting such a configuration, since the circuit other than the multiphase clock generation unit can be configured by using a digital circuit, the circuit can be realized relatively easily.

As related techniques, there are techniques disclosed in Japanese Laid-Open Patent Application No. 2010-016545 (patent document 2) and Japanese Laid-Open Patent Application No. 2009-219021 (patent document 3).

The patent document 2 discloses an oversampling method using a multiphase clock generation circuit in order to perform oversampling while suppressing consumption current. The multiphase clock generation circuit includes plural delay lines. Each delay line is formed by delay elements that are serially connected for generating delay amount according to a bias voltage. The multiphase clock generation circuit also includes two bias voltages to be supplied to the delay elements of each delay line. The bias voltage is controlled such that the difference of signal passing times between delay lines becomes a desired value, so that multiphase clocks having desired phase differences are generated by supplying a reference clock to the delay lines.

The patent document 3 discloses a data recovery circuit for restoring serial data, that is serially transferred, by oversampling the data in order to suppress consumption current. The data recovery circuit includes a multiphase clock generation unit for generating multiphase clocks, a multiphase clock control unit for stopping a part of clocks of the multiphase clocks, an oversampling unit for oversampling serial data based on clocks that are not stopped by the multiphase clock control unit, and a symbol data restoring unit for restoring serial data based on the sampling data sampled by the oversampling unit.

In the data recovery circuit, since clocks are stopped from being supplied to latch circuits that latch each bit of oversampling data for which data recovery is not required. Thus, consumption current can be reduced compared to a conventional data recovery circuit.

However, in the invention described in the patent document 1, in the normal oversampling type CDR circuit, the multiphase clocks are generated by using DLL (Delay Locked Loop) in general. When the phase difference of the multiphase clocks requested from the system becomes very small, it becomes necessary to increase operation speed of delay elements of the DLL, so that there is a problem in that consumption current increases.

Also, since there is a limitation of operation speed of the delay elements of DLL, there may be a case in which phase difference of multiphase clock requested by the system cannot be realized.

On the other hand, in recent years, there is a communication standard for performing operation at plural data communication rates, and it is required to operate at plural data rates. Since 1 unit interval (UI) that is one bit cycle of serial data is determined by the data rate, the size of the 1 UI changes according to switching of data rates. The oversampling type CDR circuit performs sampling by dividing 1 UI into N (N is an integer equal to or greater than 1) (oversampling of N times). Thus, the oversampling interval changes when 1 UI changes.

For example, in PCI/express that is one of a high-speed serial communication standard, 3 types of data rates are standardized. The 3 types of data rates are 2.5 Gbps, 5 Gbps and 8 Gbps respectively, and 1 UI for the 3 types are 400 ps, 200 ps and 125 ps respectively. For example, when oversampling of 8 times is performed on the serial data, the oversampling intervals are 50 ps, 25 ps and 15.625 ps respectively, which means that the maximum value of the oversampling interval becomes greater than three times as large as the minimum value.

In a normal oversampling type CDR circuit, the timing clock for performing oversampling is generated by PLL or DLL.

Generally, since variation of delay amount in delay elements forming the PLL and the DLL is small, it is difficult to change the oversampling interval by changing the phase difference of the timing clocks in PLL and DLL. Therefore, in the invention described in the patent document 2, plural PLLs and DLLs are prepared for changing the oversampling intervals. Although each of PLL and DLL can generate a predetermined phase difference, there is a problem in that consumed power and the circuit area are increased.

In the invention described in patent document 2, since the number of delay elements forming each delay line and the number of delay lines are large, it cannot be expected to remarkably reduce consumption current compared to the oversampling circuit using the multiphase clocks generated by the normal DLL.

According to the invention described in the patent document 3, although consumption current is reduced compared to a normal circuit, the reduction of consumption current is not sufficient, and switching between data rates is not considered.

SUMMARY OF THE INVENTION

Accordingly, it is a primary object in one embodiment of the present invention to reduce consumption power, and it is a secondary object in one embodiment of the present invention to provide an oversampling circuit that can switch between oversampling intervals, and to provide a serial communication apparatus using the oversampling circuit, and an oversampling method.

According to an embodiment of the present invention, an oversampling circuit is provided. The oversampling circuit includes:

a generation unit configured to generate multiphase serial data by delaying serial data by a predetermined time; and an oversampling unit configured to oversimple the multiphase serial data by using multiphase clocks, wherein a phase difference of the multiphase serial data is set to be a sum of an oversampling interval used in the oversampling circuit and an integral multiple of a phase difference of the multiphase clocks.

The generation unit may include a data delay unit that generates the multiphase serial data and that includes plural delay elements connected serially, wherein the phase difference of the multiphase serial data is set to be proportional to a difference of the number of delay elements through which serial data has passed.

In the oversampling circuit, the phase difference of the multiphase serial data may be set to be the same as the oversampling interval.

The oversampling circuit may include a unit configured to switch delay time of the multiphase serial data between at least two kinds of delay times.

Also, the oversampling circuit may include a unit configured to gradually increase delay amount of the delay element for generating the delay time in order to switch the delay time of the multiphase serial data.

According to another embodiment of the present invention, a serial communication apparatus is provided. The serial communication apparatus includes an oversampling circuit, and the oversampling circuit includes:

a generation unit configured to generate multiphase serial data by delaying serial data by a predetermined time; and an oversampling unit configured to oversample the multiphase serial data by using multiphase clocks, wherein a phase difference of the multiphase serial data is set to be a sum of an oversampling interval used in the oversampling circuit and an integral multiple of a phase difference of the multiphase clocks.

According to still another embodiment of the present invention, an oversampling method performed by an oversampling circuit is provided. The oversampling method includes the steps of:

generating multiphase serial data by delaying serial data by a predetermined time; and oversampling the multiphase serial data by using multiphase clocks, wherein a phase difference of the multiphase serial data is set to be a sum of an oversampling interval used in the oversampling circuit and an integral multiple of a phase difference of the multiphase clocks.

According to an embodiment of the present invention, consumption power can be reduced. Also, secondarily, the oversampling interval can be switched.

Other objects and further features of the present invention will be apparent from the following detailed description when read in conjunction with the accompanying drawings.

BRIEF DESCRIPTION OF THE DRAWINGS

FIGS. 12A and 12B are explanatory diagrams for explaining a phase control unit of the oversampling circuit according to an embodiment of the present invention;

FIG. 14 is a diagram showing a table for explaining data rate switching of the oversampling circuit;

FIG. 15 is a diagram showing a table indicating relationship between the number of passed stages and lock phase;

FIG. 16 is a diagram showing a table indicating relationship between data rates and delay amounts;

DESCRIPTION OF THE PREFERRED EMBODIMENTS

In the following, embodiments of the present invention are described with reference to figures.

<First Embodiment>

Figure 1:
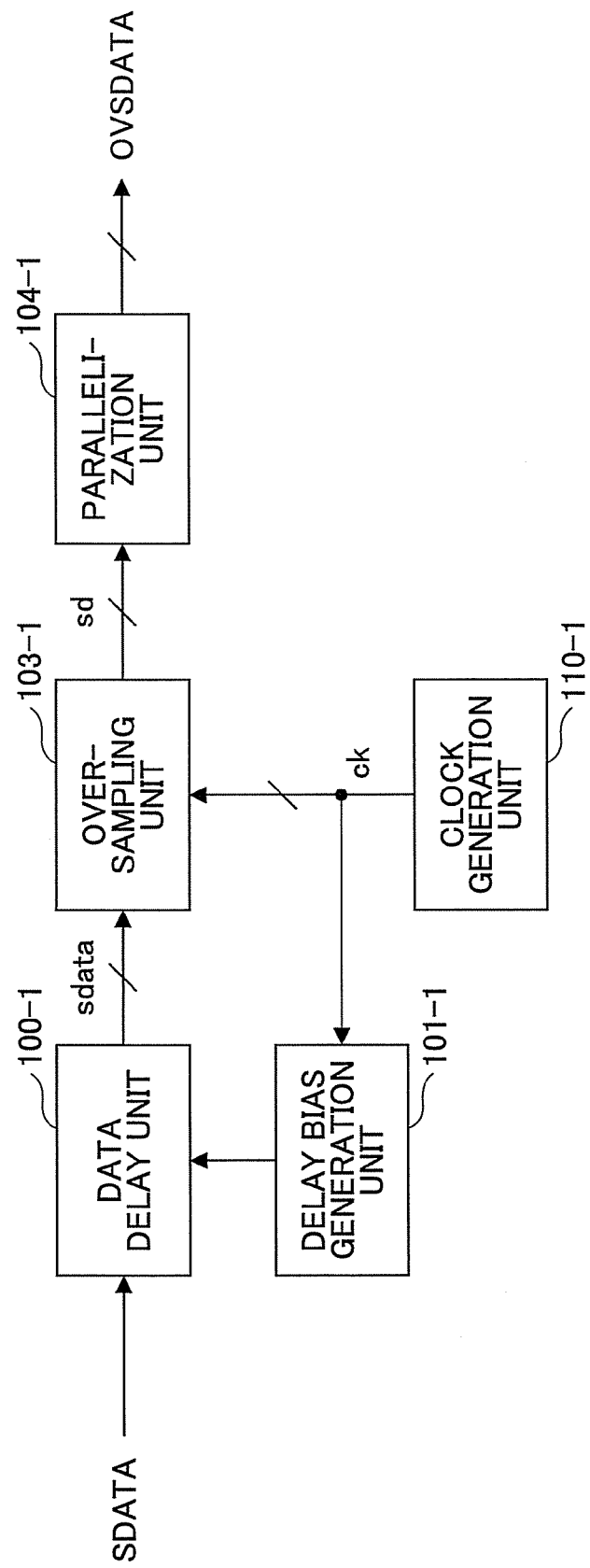
FIG. 1 is a block diagram showing an oversampling circuit of a first embodiment of the present invention.

FIG. 1 is a block diagram showing an oversampling circuit in a first embodiment of the present invention.

The oversampling circuit includes a data delay unit 100-1, a delay bias generation unit 101-1, an oversampling unit 103-1, a parallelization unit 104-1, and a clock generation unit 110-1.

The data delay unit 100-1 generates multiphase serial data "sdata" by delaying serial data "SDATA" by a predetermined time. The delay bias generation unit 101-1 generates a bias voltage to set a delay amount of the data delay unit 100-1 to be a desired amount. The oversampling unit 103-1 samples input data at a rising edge (or falling edge) of a multiphase clock.

The parallelization unit 104-1 outputs data by adjusting only timing without changing the bus width. Also, the data may be output after performing serial-parallel conversion for lowering the data rate by increasing the bus width right before or right after the parallelization unit 104-1.

When using the oversampling circuit for serial communication, OVSDATA [15:0] output from the parallelization unit 104-1 is supplied to a symbol data restoring unit, so that input data is restored (not shown in the figure). The clock generation unit 110-1 is formed by PLL (Phase Locked Loop) or DLL (Delay Locked Loop), and generates clocks necessary for the system. The after-mentioned polyphase clocks and the like are supplied by the clock generation unit 110-1.

Figure 2:
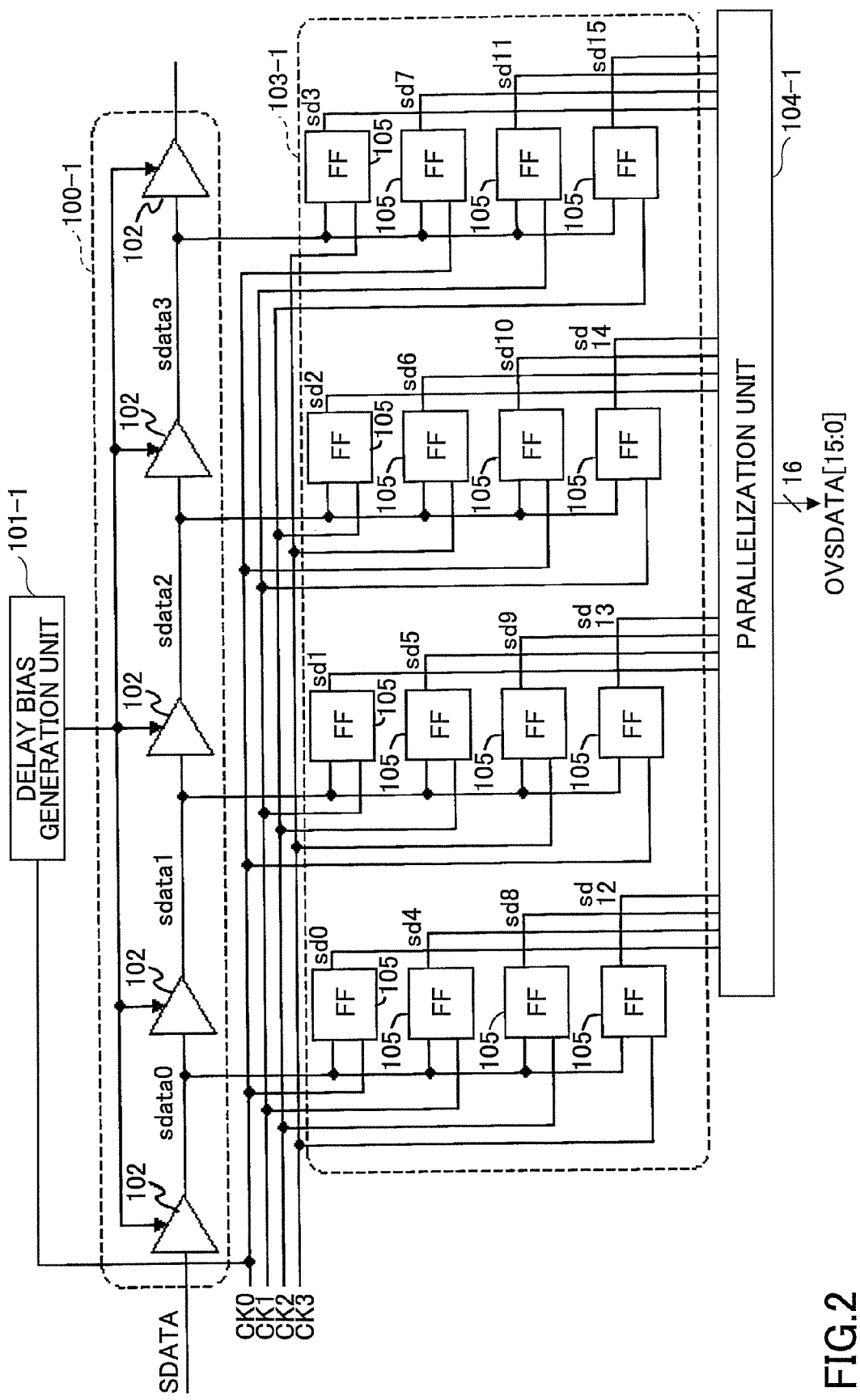
FIG. 2 is a circuit diagram showing the oversampling circuit of the first embodiment of the present invention.

FIG. 2 shows a concrete circuit diagram of the oversampling circuit according to the first embodiment of the present invention. Each circuit block is described below.

The data delay unit 100-1 includes plural data delay elements 102 (5 elements in the example shown in the figure, but the number is not limited to 5) that are serially connected. The data delay unit 100-1 generates multiphase serial data "sdata [3:0]" by delaying supplied serial data "SDATA" by a predetermined time.

The data delay element 102 includes a circuit for changing time that input data takes to pass through the element 102 according to an input bias voltage.

Figure 3C:
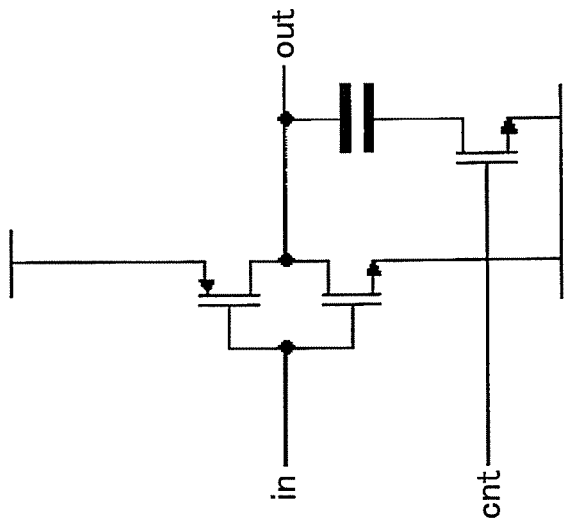
FIG. 3C is a block diagram showing an example of a data delay element 102 including MOS transistors and a condenser.
Figure 3B:
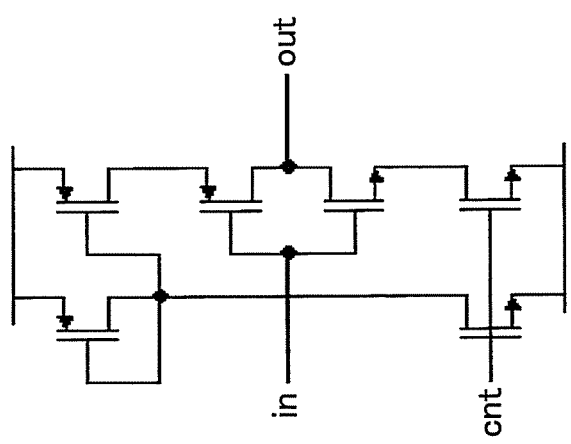
FIG. 3B is a block diagram showing an example of a data delay element 102 including MOS transistors.
Figure 3A:
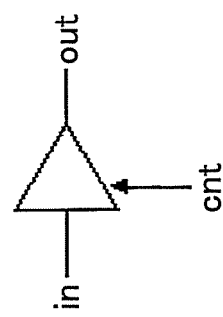
FIG. 3A is a block diagram showing an example of a data delay element 102.

FIG. 3A is an example of a block diagram of the data delay element 102. FIG. 3B is an example of a circuit diagram of the data delay element 102 including MOS transistors. FIG. 3C is another example of a circuit diagram of the data delay element 102 including MOS transistors and a condensers. These data delay elements are based on known techniques.

Figure 4:
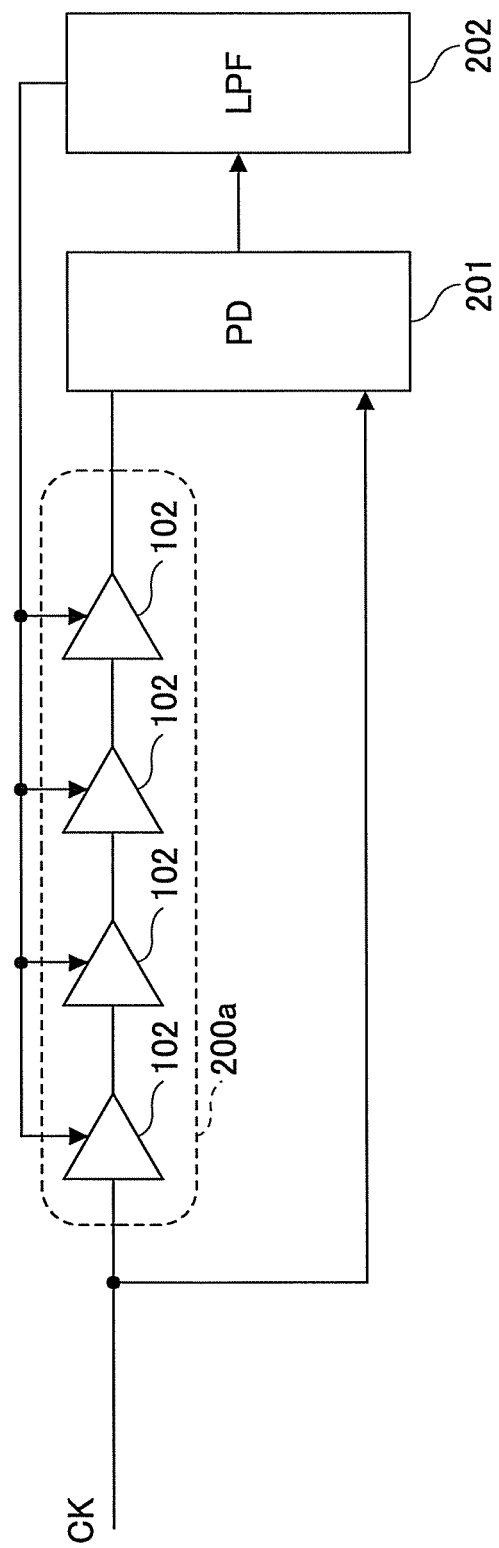
FIG. 4 is a block diagram showing an example of a delay bias generation unit used in the first embodiment.

FIG. 4 is an example of a block diagram of the delay bias generation unit used in the first embodiment. The delay bias generation unit 101-1 shown in the figure includes a delay line 200a, a phase comparator (PD) 201 for detecting phase difference between two inputs, and an averaging filter (LPF) 202 for averaging outputs of the phase comparator.

Returning back to FIG. 2, the delay bias generation unit 101-1 generates a bias for generating a desired delay amount for the delay elements 102. As mentioned above, the delay bias generation unit 101-1 includes a delay line in which delay elements 102 are serially connected, a phase comparator for detecting phase difference between two inputs, and an averaging filter for averaging outputs of the phase comparator. The output of the averaging filter is connected to delay amount control terminals of the delay line. The delay bias generation unit 101-1 detects a phase difference of a clock between before and after the clock passes through the delay line, so as to control a delay amount control bias of the delay element 102 such that the phase difference becomes a desired value. The delay bias generation unit 101-1 itself is a known technique.

The oversampling unit 103-1 includes plural flip-flops (FF) 105 (16 FFs in the example of the figure, but the number is not limited to 16). Each of the flip-flop 105 samples input serial data at the rising edge (or the falling edge) of a clock that is corresponding one of multiphase clocks (CK0-CK3). The outputs "sd[15:0]" of the oversampling unit 103-1 have phase differences of the sampling clocks.

In the present embodiment, as an example, a case is described in which the data rate of the serial data is 5 Gbps and 1 UI is 200 ps, and the serial data is oversampled at intervals of 25 ps (corresponding to oversampling of 40 GHz).

In order to sample the serial data of 5 Gbps in which 1 UI=200 ps at intervals of 25 ps, 8 phases of 5 GHz clocks become necessary (200 ps/25 ps=8 phases).

In the present embodiment, the data delay unit 100-1 generates multiphase serial data corresponding to 5 GHz and 4 phases, and oversampling is performed with sampling clocks corresponding to 5 GHz and 2 phases, so that oversampling equivalent to 40 GHz is realized. Of course, the number of phases of the multiphase serial data and the selection of the oversampling clocks are not limited to the above-mentioned examples, and these values can be arbitrarily selected.

In the present embodiment, although clocks of 2.5 GHz of 4 phases are used as oversampling clocks of 5 GHz of 2 phases as shown in FIG. 2, the values of the oversampling clocks are not limited to these and can be selected arbitrarily.

The serial data "SDATA" is supplied to the data delay unit 100-1, so that the data delay unit 100-1 generates a delay of 125 ps, per one delay element 102, that is a sum of the oversampling interval 25 ps and a phase difference 100 ps of the oversampling clock. That is, a data delay time between sdata[n] and sdata[n+1] is 125 ps in the present embodiment.

Assuming that the oversampling interval is Tovs and that the phase difference of the oversampling clock is Tsmp, the following equation (1) holds true.

$$sdata[n+1]-sdata[n]=Tovs+N\times Tsmp \text{ (n=0, 1, 2, 3, and N is an integer)} \quad (1)$$

In the present embodiment, N=1 is used as an example. But, N is not limited to 1, and another value can be selected.

In realizing the oversampling interval 25 ps, the phase difference of the multiphase clocks is 100 ps, and the phase difference of the multiphase serial data is 125 ps. Thus, operation speed of the delay elements 102 for generating the multiphase serial data and operation speed of a circuit for generating the multiphase oversampling clocks can be eased, so that it becomes possible to reduce the consumption current. Further, since the number of delay elements can be reduced compared to a normal data delay type oversampling circuit, the consumption current and the circuit area can be suppressed.

More particularly, in the case when performing oversampling of 8 times by inputting serial data of a data rate of 5 Gbps, according to the oversampling circuit of the first embodiment, compared to a conventional data delay type oversampling circuit, about 40% of the consumption power in the data delay part can be reduced.

Figure 5:
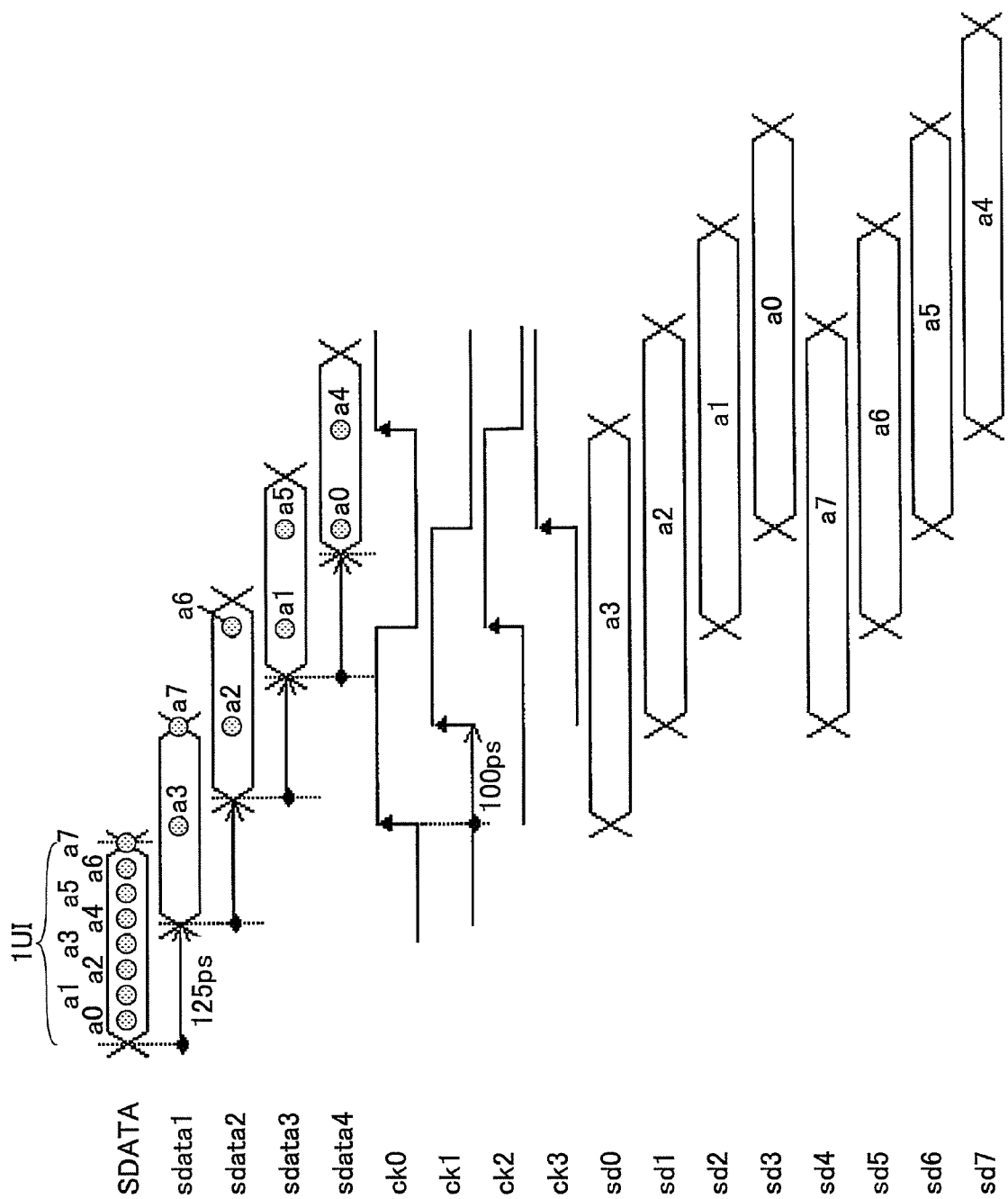
FIG. 5 is an explanatory diagram showing sampling timing in the first embodiment.

FIG. 5 is an explanatory diagram for explaining sampling timing according to the first embodiment.

In the present embodiment, as an example, a case is described in which the data rate of the serial data is 5 Gbps and 1 UI is 200 ps, and the serial data is oversampled at intervals of 25 ps (corresponding to oversampling of 40 GHz).

The serial data "SDATA" is supplied to the data delay unit 100-1. The serial data "SDATA" passes through each delay element 102, so that the multiphase serial data "sdata[3:0]" at intervals of 125 ps is generated. The rate of each of oversampling clocks ck0, ck1, ck2 and ck3 is 2.5 GHz, and the phase difference of the clocks is 100 ps.

For the sake of convenience of explanation, when it is assumed that 1 UI of SDATA is divided equally into 8, and that divided parts are indicated as a0-a7 from the top, sd3 obtained by sampling sdata3 with the oversampling clock ck3 becomes a0, sd2 obtained by sampling sdata2 with the oversampling clock ck2 becomes a1, sd1 obtained by sampling sdata1 with the oversampling clock ck1 becomes a2, and sd0 obtained by sampling sdata0 with the oversampling clock ck0 becomes a3. Similarly, a4-a7 can be also sampled by combinations of sdata0, 1, 2, 3 and oversampling clocks ck0, 1, 2, 3.

<Second Embodiment>

Figure 6:
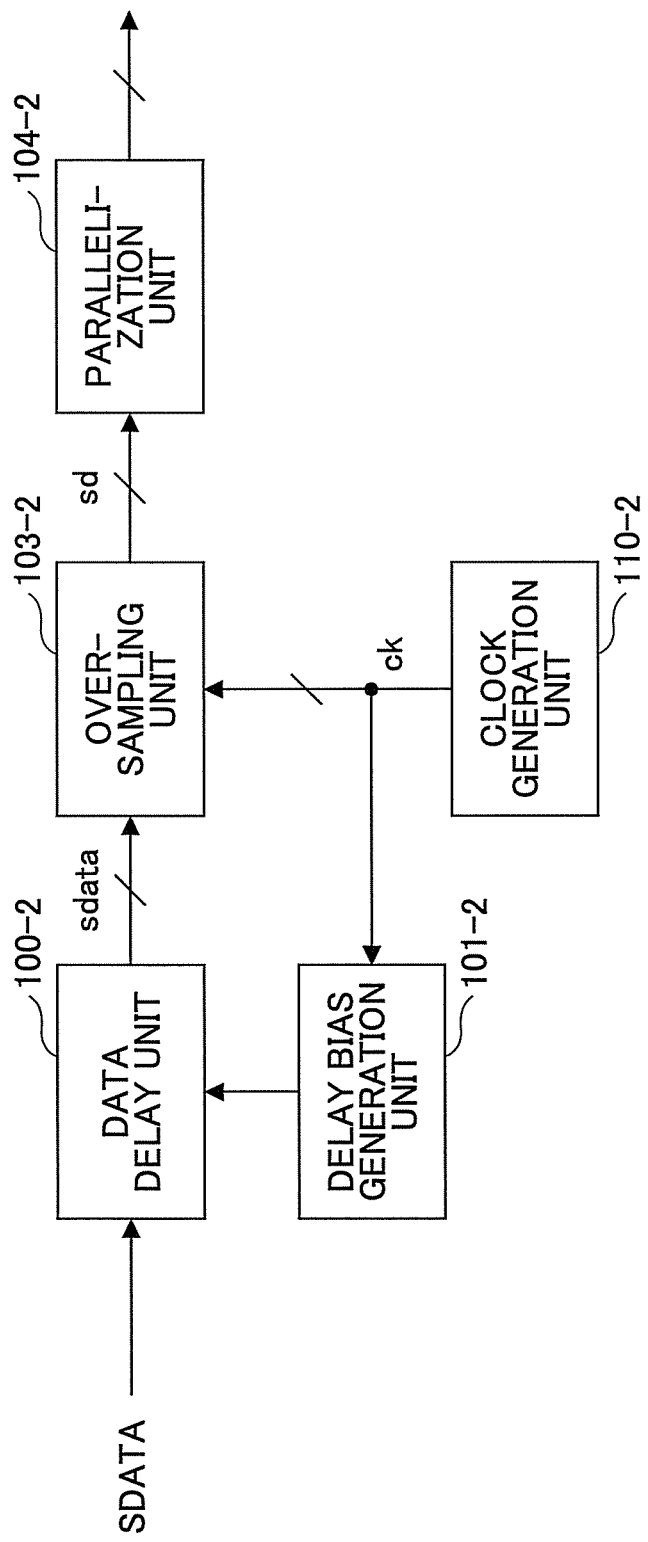
FIG. 6 is a block diagram showing an oversampling circuit of a second embodiment of the present invention.

FIG. 6 is a block diagram showing an oversampling circuit in a second embodiment of the present invention.

The oversampling circuit includes a data delay unit 100-2, a delay bias generation unit 101-2, an oversampling unit 103-2, a parallelization unit 104-2, and a clock generation unit 110-2.

The data delay unit 100-2 generates multiphase serial data "sdata" by delaying serial data "SDATA" by a predetermined time. The delay bias generation unit 101-2 generates a bias voltage to set a delay amount of the data delay unit 100-2 to be a desired amount. The oversampling unit 103-2 samples input data at a rising edge (or falling edge) of a multiphase clock.

The parallelization unit 104-2 outputs data by adjusting only timing without changing the bus width. Also, the data may be output after performing serial-parallel conversion for lowering the data rate by increasing the bus width right before or right after the parallelization unit 104-2.

When using the oversampling circuit for serial communication, OVSDATA [15:0] output from the parallelization unit 104-2 is supplied to a symbol data restoring unit, so that input data is restored (not shown in the figure). The clock generation unit 110-2 is formed by PLL (Phase Locked Loop) or DLL (Delay Locked Loop), and generates clocks necessary for the system. The after-mentioned polyphase clocks and the like are supplied by the clock generation unit 110-2.

Figure 7:
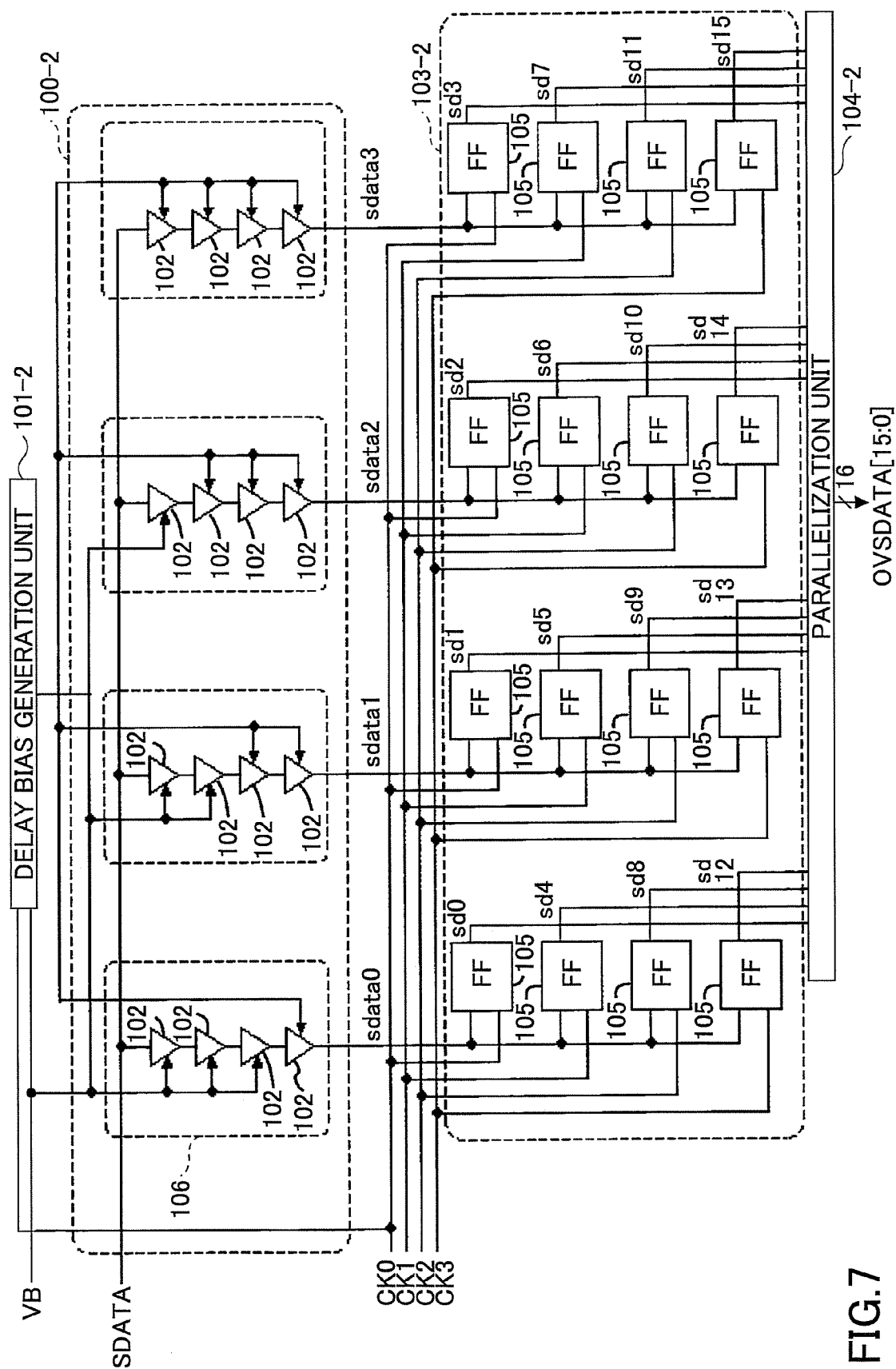
FIG. 7 is a circuit diagram showing the oversampling circuit of the second embodiment of the present invention.

FIG. 7 shows a concrete circuit diagram of the oversampling circuit according to the second embodiment of the present invention. Each circuit block is described below.

The data delay unit 100-2 includes plural data delay lines 106 (4 lines in the example shown in the figure, but the number is not limited to 4). Each of the data delay lines 106 receives serial data "SDATA". The time that input data takes to pass through the data delay line 106 is different for each of the data delay lines 106. Thus, by passing through the data delay lines 106 of different passing times, the serial data "SDATA" becomes multiphase serial data "sdata[3:0]" so that the multiphase serial data "sdata[3:0]" is output from the data delay unit 100-2.

Each delay line 106 is formed by connecting plural delay elements 102 serially and generates passing time difference according to a supplied bias voltage. The delay element 102 is the same as one in the first embodiment.

The delay bias generation unit 101-2 generates bias voltages such that each delay element 102 that forms each delay line 106 generates a desired delay time.

Figure 8:
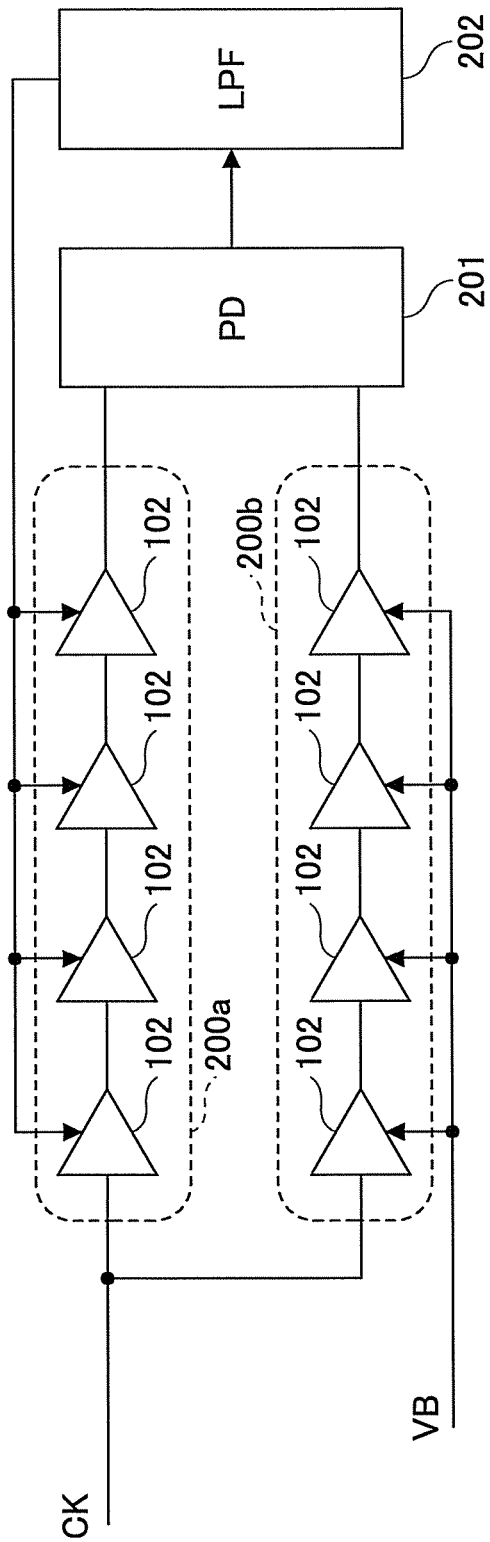
FIG. 8 is a block diagram showing an example of a delay bias generation unit used in the second embodiment.

FIG. 8 is an example of a block diagram of the delay bias generation unit 101-2 used in the second embodiment.

The delay bias generation unit 101-2 includes two delay lines 200a and 200b, a phase comparator (PD) 201 for detecting phase difference between two inputs, and an averaging filter (LPF) 202 for averaging outputs of the phase comparator 201.

A reference voltage VB is connected to delay amount control terminals of the delay line 200b that is one of the two delay lines 200 and 200b, and output of the averaging filter 202 is connected to delay amount control terminals of the other delay line 200a. A reference clock is supplied to each of the delay lines 200a and 200b. The phase comparator (PD) 201 detects a phase difference of outputs of the delay lines 200a and 200b, so as to control the delay amount control bias of delay elements 102 of the delay lines 200a and 200b such that the phase difference becomes a desired value. The delay bias generation unit 101-2 itself is based on a known technique.

The oversampling unit 103-2 includes plural flip-flops (FF) 105 (16 FFs in the example of the figure, but the number is not limited to 16). Each of the flip-flop 105 samples input serial data at the rising edge (or the falling edge) of a clock that is corresponding one of multiphase clocks (CK0 CK3). The outputs "sd[15:0]" of the oversampling unit 103-2 have phase differences of the sampling clocks.

In the present embodiment, as an example, a case is described in which the data rate of the serial data is 5 Gbps and 1 UI is 200 ps, and the serial data is oversampled at intervals of 25 ps (corresponding to oversampling of 40 GHz).

In order to sample the serial data of 5 Gbps in which 1 UI=200 ps at intervals of 25 ps, 8 phases of 5 GHz clocks become necessary (200 ps/25 ps=8 phases).

In the present embodiment, the data delay unit 100-2 generates multiphase serial data corresponding to 5 GHz and 4 phases, and oversampling is performed with sampling clocks corresponding to 5 GHz and 2 phases, so that oversampling equivalent to 40 GHz is realized. Of course, the number of phases of the multiphase serial data and the selection of the oversampling clocks are not limited to the above-mentioned examples, and these values can be arbitrarily selected.

In the present embodiment, although clocks of 2.5 GHz of 4 phases are used as oversampling clocks of 5 GHz of 2 phases as shown in FIG. 7, the values of the oversampling clocks are not limited to these and can be selected arbitrarily.

The serial data SDATA is supplied to the data delay unit 100-2, and a delay time of each delay line is generated such that a phase difference between adjacent delay lines becomes 25 ps. That is, a data delay time between sdata[n] and sdata[n+1] becomes 125 ps.

In realizing the oversampling interval 25 ps, operation speed of the delay elements 102 for generating the multiphase serial data and operation speed of a circuit for generating the multiphase oversampling clocks can be eased, so that it becomes possible to reduce the consumption current.

Further, since the number of delay elements can be reduced compared to a normal data delay type oversampling circuit, the consumption current and the circuit area can be reduced.

More particularly, in the case when performing oversampling of 8 times by inputting serial data of a data rate of 5 Gbps, according to the oversampling circuit of the second embodiment, compared to a conventional data delay type oversampling circuit, about 25% of the consumption power in the data delay part can be reduced.

Figure 9:
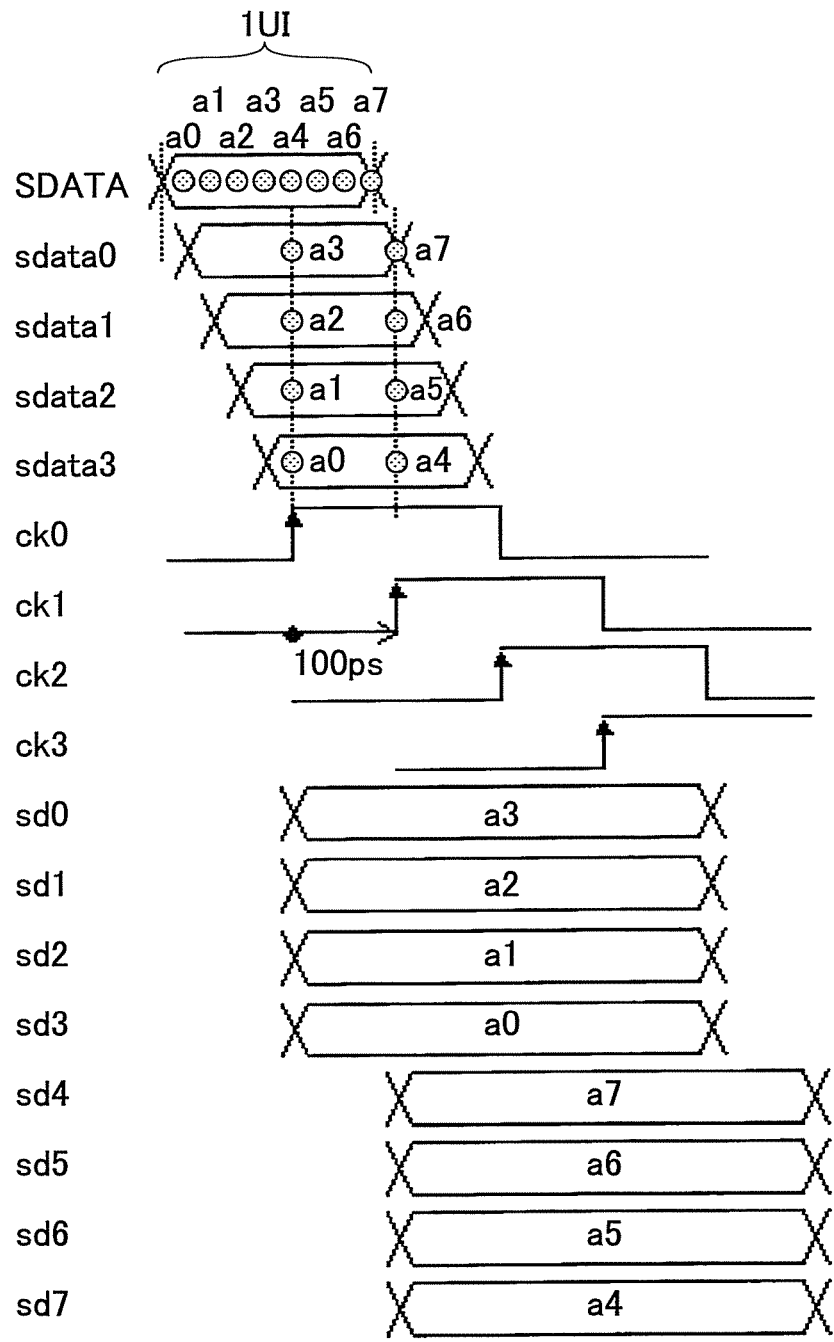
FIG. 9 is an explanatory diagram showing sampling timing in the second embodiment.

FIG. 9 is an explanatory diagram for explaining sampling timing according to the second embodiment.

In the present embodiment, as an example, a case is described in which the data rate of the serial data is 5 Gbps and 1 UI is 200 ps, and the serial data is oversampled at intervals of 25 ps (corresponding to oversampling of 40 GHz).

The serial data "SDATA" is supplied to the data delay unit 100-2. The serial data "SDATA" passes through each delay line, so that the multiphase serial data "sdata[3:0]" at intervals of 25 ps is generated. The rate of each of oversampling clocks ck0, ck1, ck2 and ck3 is 2.5 GHz, and the phase difference of the clocks is 100 ps.

For the sake of convenience of explanation, when it is assumed that 1 UI of SDATA is divided equally into 8, and that divided parts are indicated as a0-a7 from the top, sd3 obtained by sampling sdata3 with the oversampling clock ck0 becomes a0, sd2 obtained by sampling sdata1 with the oversampling clock ck0 becomes a1, sd1 obtained by sampling sdata2 with the oversampling clock ck0 becomes a2, and sd0 obtained by sampling sdata0 with the oversampling clock ck0 becomes a3. Similarly, a4-a7 can be also sampled by combinations of sdata0, 1, 2, 3 and oversampling clocks ck0, 1, 2, 3 as shown in FIG. 9.

As mentioned above, according to the first and the second embodiments, by providing a function for inputting serial data into a delay circuit and generating multiphase serial data delayed by a predetermined time from the serial data, and a function for oversampling the multiphase serial data with multiphase clocks, the number of delay elements used for the delay circuit can be decreased, so that consumption current can be reduced.

<Third Embodiment>

Figure 10:
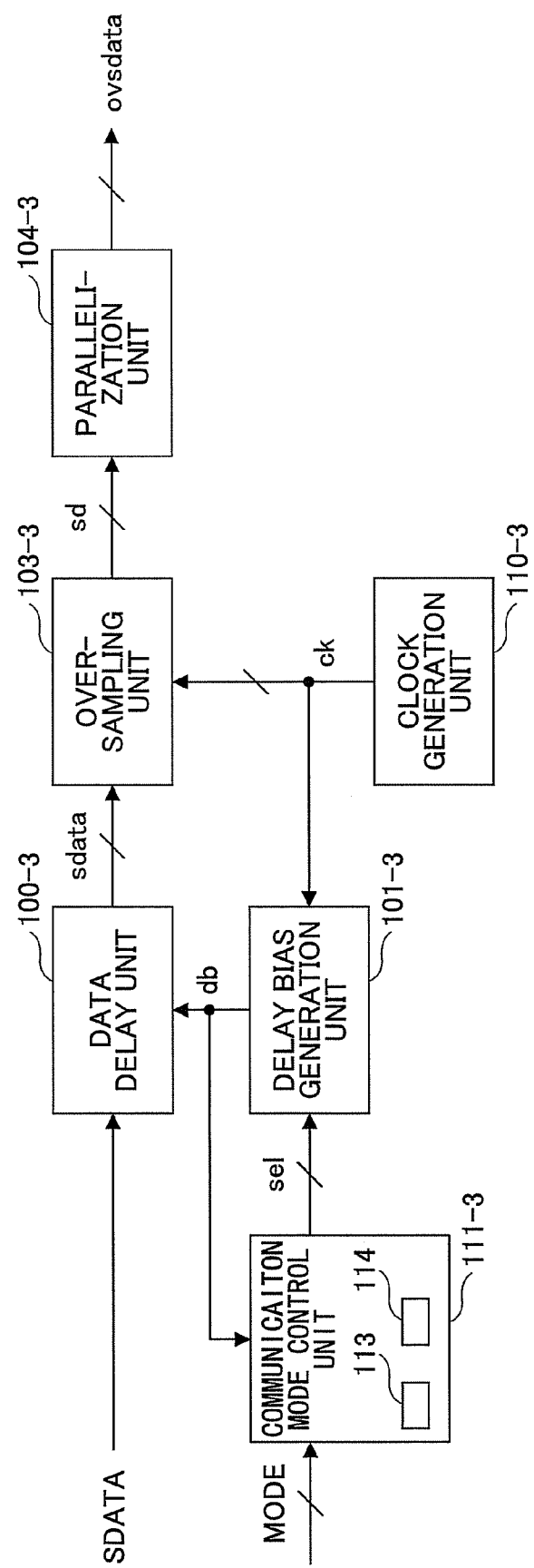
FIG. 10 is a block diagram showing an oversampling circuit of a third embodiment of the present invention.

FIG. 10 is a block diagram showing an oversampling circuit in a third embodiment of the present invention.

The oversampling circuit includes a data delay unit 100-3, a delay bias generation unit 101-3, a communication mode control unit 111-3, an oversampling unit 103-3, a parallelization unit 104-3, and a clock generation unit 110-3.

The data delay unit 100-3 generates multiphase serial data "sdata" by delaying serial data "SDATA" by a predetermined time. The delay bias generation unit 101-3 generates a bias voltage to set a delay amount of the data delay unit 100-3 to be a desired amount.

The communication mode control unit 111-3 performs monitoring and control such that a bias signal "db" of the delay bias generation unit 101-3 becomes a desired value, such that the data delay unit 100-3 generates data delay amount determined for each communication mode signal DR. The communication mode control unit 111-3 includes a sequence control unit 113 and a lock detection unit 114, which are described later.

The oversampling unit 103-3 samples input data at a rising edge (or falling edge) of a multiphase clock.

The parallelization unit 104-3 outputs data by adjusting only timing without changing the bus width. Also, the data may be output after performing serial-parallel conversion for lowering the data rate by increasing the bus width right before or right after the parallelization unit 104-3.

When using the oversampling circuit for serial communication, OVSDATA [15:0] output from the parallelization unit 104-3 is supplied to a symbol data restoring unit, so that input data is restored (not shown in the figure). The clock generation unit 110-3 is formed by PLL (Phase Locked Loop) or DLL (Delay Locked Loop), and generates clocks necessary for the system. The after-mentioned polyphase clocks and the like are supplied by the clock generation unit 110-3.

Figure 11:
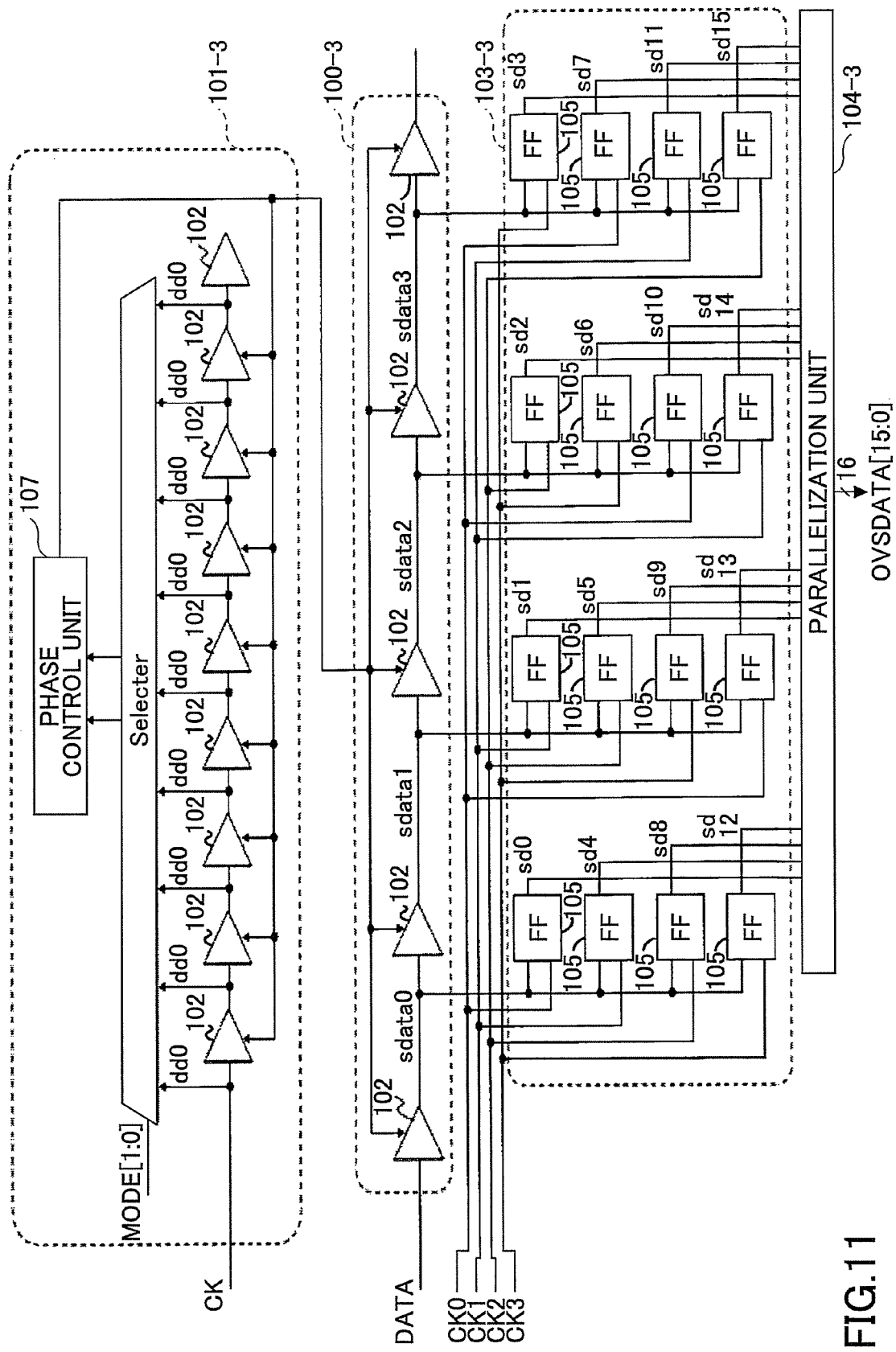
FIG. 11 is a circuit diagram showing the oversampling circuit of the third embodiment of the present invention.

FIG. 11 shows a concrete circuit diagram of the oversampling circuit according to the third embodiment of the present invention. Each circuit block is described below.

The data delay unit 100-3 includes plural data delay elements 102 (9 elements in the example shown in the figure, but the number is not limited to 9) that are serially connected. The data delay unit 100-3 generates multiphase serial data "sdata [3:0]" by delaying supplied serial data "SDATA" by a predetermined time by passing the input serial data through each delay element 102.

The data delay element 102 includes a circuit for changing time that input data takes to pass through the element 102 according to an input bias voltage.

The oversampling unit 103-3 includes plural flip-flops (FF) 105 (16 FFs in the example of the figure, but the number is not limited to 16). Each of the flip-flop 105 samples input serial data at the rising edge (or the falling edge) of a clock that is corresponding one of multiphase clocks (CK0 CK3). The outputs "sd[15:0]" of the oversampling unit 103-3 have phase differences of the sampling clocks.

The delay bias generation unit 101-3 includes plural data delay elements 102, a signal selector 106 and a phase control unit 107. In the delay bias generation unit 101-3, a clock signal "CK" is supplied to the serially arranged data delay elements 102 so as to generate delay data "dd[8:0]". At this time, the data delay amount of each data delay element 102 is determined according to the data delay bias "db". The signal selector 107 selects delay data from the delay data "dd[8:0]" according to a data selection signal "MODE[1:0]" supplied from the communication mode control unit 111-3, and outputs the data to the phase control unit 107. The phase control unit 107 includes a function for generating a bias such that phase differences of input signals become equal.

FIG. 12A shows an example of the phase control unit 107. The phase control unit 107 includes an EOR (Exclusive OR) part 210, an LPF (Low Pass Filter) 211, and a comparator 212. FIG. 12B shows operation of the phase control unit 107. Assuming that a state in which the phase difference between input signals D0 and D1 is small is the initial state, a pulse having a small duty ratio is output as the output Y0 of EOR. By controlling the output Y0 such that the duty ratio of the output Y0 becomes 50%, it becomes possible to detect phase difference of 90 degrees of the input clock and to lock that state.

For example, when a clock of 2.5 GHz is used as an input signal "CK" of the delay bias generation unit, since the 1 cycle is 400 ps, a delay amount of 100 ps of 90 degree phase is detected and locked.

The communication mode control unit 111-3 includes the sequence control unit 113 and the lock detection unit 114. The communication mode control unit 111-3 controls pull-in operation for setting the data delay bias "db" into a desired value in order to generate a data delay amount of the data delay element 102 according to the communication mode signal "DR[1:0]". The lock detection unit 114 has a function for receiving the delay bias "db" generated by the delay bias generation unit 101-3 so as to detect that the delay bias stabilizes. The lock detection signal "lock" is output to the sequence control unit 113. The sequence control unit 113 switches the data selection signal "MODE[1:0]" to be output to the delay bias generation unit 101-3 based on a predetermined procedure according to the communication mode signal "DR[1:0]". The switching of the data selection signal "MODE[1:0]" is performed on condition that the lock detection signal "lock" is detected. Accordingly, synchronization pulling-in of the delay bias "db" can be realized with reliability. Although the communication mode control unit 111-3 includes the lock detection unit 114 in the present embodiment, the lock detection unit 114 is not essential. Even if the lock detection unit 114 is not included, the synchronization pulling-in of the delay bias "db" can be realized by providing sufficient time margin for switching the data selection signal "MODE[1:0]".

Figure 13:
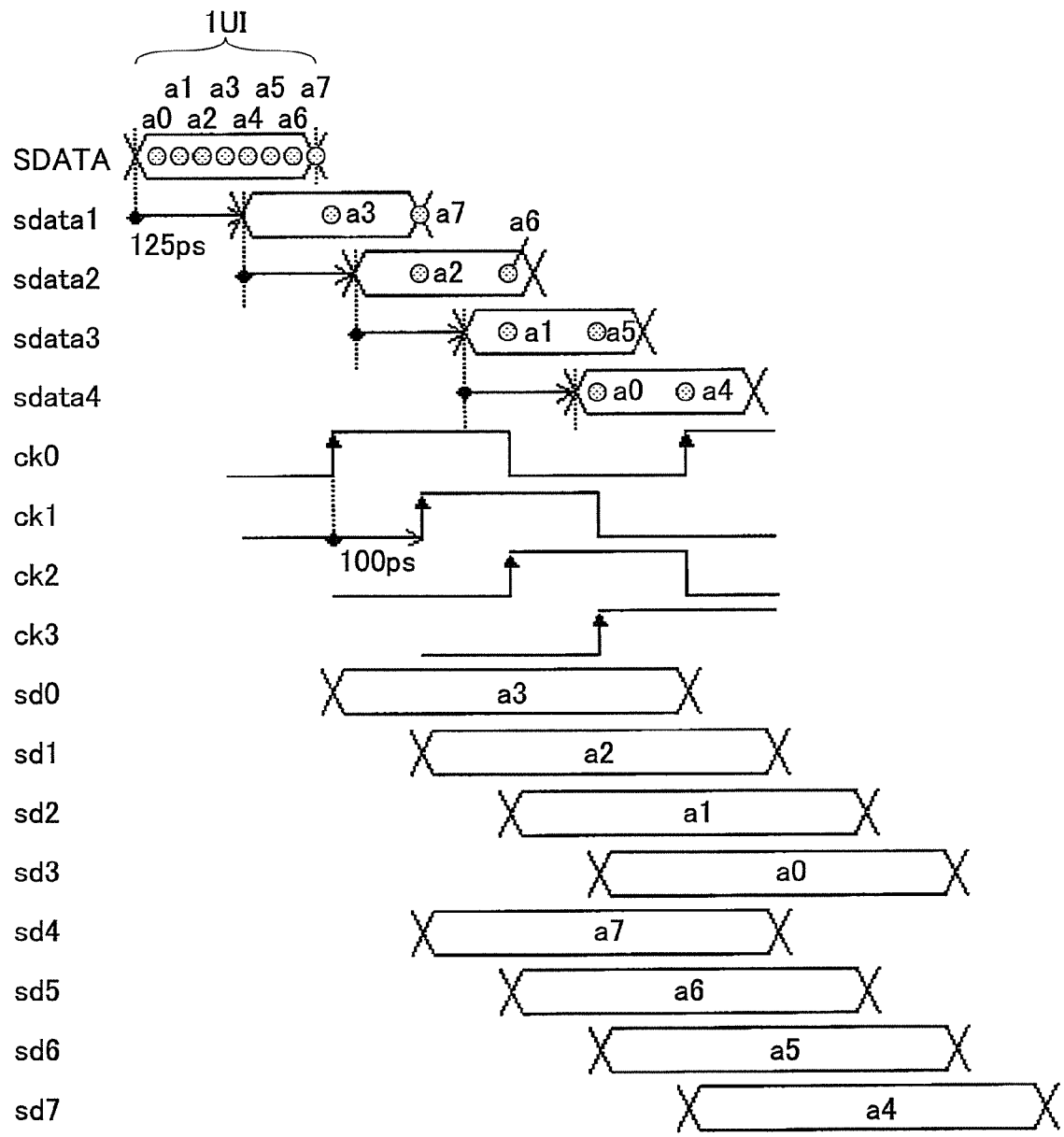
FIG. 13 is an explanatory diagram showing sampling timing in the third embodiment.

FIG. 13 is an explanatory diagram for explaining sampling timing of the oversampling circuit used in the third embodiment.

In the present embodiment, as an example, a case is described in which the data rate of the serial data is 5 Gbps and 1 UI is 200 ps, and the serial data is oversampled at intervals of 25 ps (corresponding to oversampling of 40 GHz).

The serial data "SDATA" is supplied to the data delay unit 100-3. The serial data "SDATA" passes through each delay element 102, so that the multiphase serial data "sdata[3:0]" at intervals of 125 ps is generated. The rate of each of oversampling clocks ck0, ck1, ck2 and ck3 is 2.5 GHz, and the phase difference of the clocks is 100 ps.

For the sake of convenience of explanation, when it is assumed that 1 UI of SDATA is divided equally into 8, and that divided parts are indicated as a0-a7 from the top, sd3 obtained by sampling sdata3 with the oversampling clock ck3 becomes a0, sd2 obtained by sampling sdata2 with the oversampling clock ck2 becomes a1, sd1 obtained by sampling sdata1 with the oversampling clock ck1 becomes a2, and sd0 obtained by sampling sdata0 with the oversampling clock ck0 becomes a3. Similarly, a4-a7 can be also sampled by combinations of sdata0, 1, 2, 3 and oversampling clocks ck0, 1, 2, 3 as shown in FIG. 13.

Next, switching between communication modes is described. FIG. 14 shows a table for explaining switching of data rates of the oversampling circuit.

FIG. 14 shows data rates to be used by the oversampling circuit and the specification values (1UI, oversampling number, oversampling interval, oversampling clock phase difference, multiphase serial data phase difference). Each of the specification values is an example, and can be changed arbitrarily.

In the following, it is considered to change Tovs (oversampling interval) according to the data rate. As mentioned before, when it is assumed that the phase difference of the multiphase serial data generated by the data delay unit 100-3 is TD, the oversampling interval is Tovs, and that phase difference of the oversampling clock is Tck, the following equation (2) holds true.

$$TD = Tovs + N \times Tck \text{ (N is an integer)} \quad (2)$$

The following equation (3) is obtained by normalizing, with TD, a change amount dTD of TD when Tovs changes by dTovs.

$$dTD/TD = dTovs/TD = dTovs/(Tovs+Tck) \quad (3)$$

Generally, since Tck is set to be large compared with Tovs, the value of dTD/TD becomes small. Therefore, it becomes possible to reduce variation range of the delay amount of the data delay element that is obtained when switching the oversampling interval.

In the following, an example is described using concrete values in which N=1 as an example.

In the case when switching the data rate of the serial data from 2.5 Gbps to 5 Gbps, the oversampling intervals at each data rate become Tovs_2.5 Gbps=50 ps and Tovs_5 Gbps=25 ps respectively. Therefore, the variation "dTovs" of Tovs according to switching between the data rates is represented as the following equation (4).

$$dTovs = Tovs\_2.5 \text{ Gbps} - Tovs\_5 \text{ Gbps} \quad (4)$$
$$= 50 \text{ ps} - 25 \text{ ps}$$
$$= 25 \text{ ps}$$

It is assumed that the oversampling clock is 2.5 GHz in any data rates, and that 4 phase multiphase clock is used. Thus, Tck=100 ps.

In this case, when the data rate is 2.5 Gbps, the delay amount TD of the multiphase serial data becomes 150 ps (TD_2.5 Gbps=150 ps), and when the data rate is 5 Gbps, the delay amount TD of the multiphase serial data becomes 125 ps (TD_5 Gbps=125 ps). The change amount dTD of the delay amount TD of the multiphase serial data due to the switching of data rates becomes the following equation (5).

$$dTD = TD\_2.5 \text{ Gbps} - TD\_5 \text{ Gbps} \quad (5)$$
$$= 150 \text{ ps} - 125 \text{ ps}$$
$$= 25 \text{ ps}$$

Thus, dTD/TD 5 Gbps=25/125=0.2 holds true. As evidenced by this result, even when the oversampling interval is switched to double, the change amount of the delay amount of the multiphase serial data is suppressed to 20%.

Accordingly, operation speed of the data delay element for generating the delay amount of the multiphase serial data can be eased and the operation range can be suppressed, so that operation in lower consumption power becomes available compared to a normal oversampling circuit.

The oversampling circuit of the present embodiment has a function for switching the oversampling interval according to communication modes of three types of data rates. As mentioned before, the data delay amount generated by the data delay element 102 in each data rate becomes 150 ps in data rate of 2.5 Gbps, 125 ps in data rate of 5 Gbps, and 112.5 ps in data rate of 10 Gbps. The number of stages of the data delay elements 102 and the delay amounts in operation of each data rate are shown in FIG. 15.

As shown in FIG. 15, in the 2.5 Gbps, the delay amount per 1 stage of the data delay element 102 becomes 150 ps. The phase difference of 100 ps appears in a signal that has passed through 6 stages of data delay elements 102, the phase difference of 100 ps being 90 degree phase of 2.5 GHz clock necessary for delay amount control. Similarly, in the 5 Gbps, the delay amount per 1 stage of the data delay element 102 becomes 125 ps. The phase difference of 100 ps appears in a signal that has passed through 4 stages of data delay elements 102, the phase difference of 100 ps being 90 degree phase of 2.5 GHz clock necessary for delay amount control. Also, in the 10 Gbps, the delay amount per 1 stage of the data delay element 102 becomes 112.5 ps. The phase difference of 100 ps appears in a signal that has passed through 8 stages of data delay elements 102, the phase difference of 100 ps being 90 degree phase of 2.5 GHz clock necessary for delay amount control.

Therefore, the signal selector 106 selects dd1 and dd7 at 2.5 Gbs, selects dd2 and dd6 at 5 Gbs, and selects dd0 and dd8 at 10 Gbs. The selected signals are output to the phase control unit 107, so that the phase control unit 107 controls a bias for causing the data delay element 102 to generate a desired phase difference.

Since the phase control unit 107 uses the EOR 110 (FIG. 12A) as a phase detection circuit, it is necessary that the phase difference of the input signals when starting the operation falls within a range of ±90 degrees in order to lock the signal at 90 degrees. If the initial phase difference falls outside the range, the signal is locked at 270 degrees, so that the phase relationship is reversed and erroneous operation occurs.

Among the three types of data rates, the number of passing data delay elements 102 is different for the signal that is used for detection of phase difference in the phase control unit 107, and the number is large. Thus, it may be difficult to always set the initial phase difference of the signal used for detection of phase difference to fall within the range of ±90 degrees.

For example, when the data rate is 10 Gbps, the delay amount per one stage of the data delay element 102 becomes 112.5 ps. The phase difference of 100 ps necessary for delay amount control appears at a signal that have passed through 8 stages of the data delay elements 102. Assuming that the delay amount per one stage of the data delay element 101 is T0, the condition for the phase difference of the input signal to be locked at 90 degrees is represented as the following equation (6).

$$Tck-100<8\times TD<Tck+100 \text{(Tck is a cycle of input signal, Tck=400 ps)} \quad (6)$$

Therefore, 87.5<TD<112.5 holds true for TD. If the operation starts with a value within this range, the delay amount T0 per one stage of the data delay element 102 locks at TD=112.5 ps.

In the same way, according to calculation for other data rates, values shown in the table of FIG. 16 are obtained.

There is no initial phase difference that satisfies every data rate. Thus, it is necessary to start operation by locking the initial phase difference of 100 ps per one stage of the data delay element 102 when the data rate is 10 Gbps or 5 Gbps. Also, when the data rate is 2.5 Gbps, it is necessary to start operation by locking the initial phase difference of 125 ps per one stage of data delay element 102 of the 5 Gbps mode.

Figure 17:
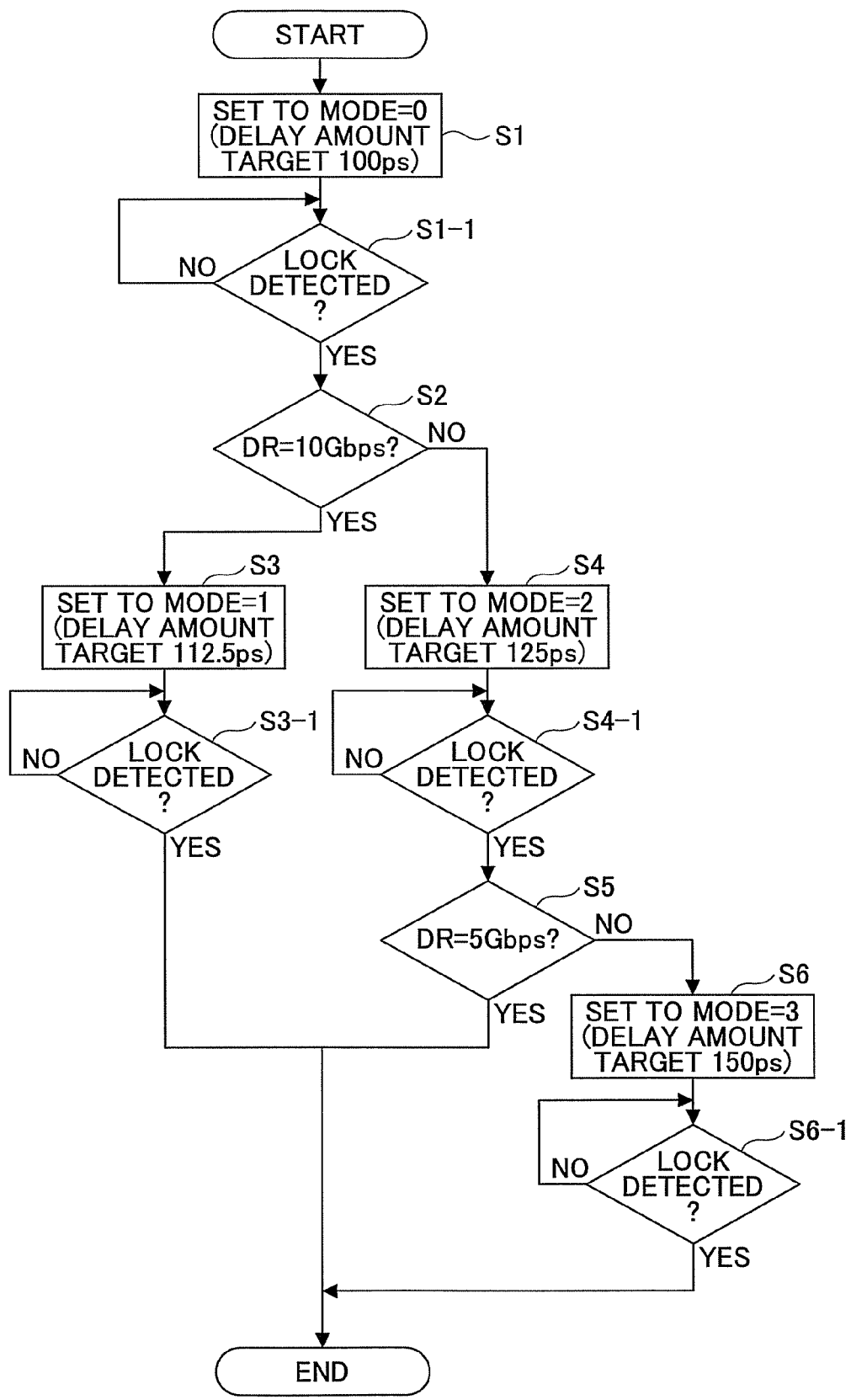
FIG. 17 is a flowchart showing an example of a flow for switching between oversampling intervals of the oversampling circuit according to an embodiment of the present invention.

As described above, the communication mode control unit 111-3 performs a sequence procedure for pulling in the data delay amount of the data delay element 102 corresponding to a data rate. In the communication mode control unit 111-3, the sequence control unit 113 switches the data selection signal "MODE[1:0]" according to the communication mode selection signal "DR[1:0]" so as to control the pulling-in operation for proper delay amount. FIG. 17 shows a flowchart of a procedure for switching the data selection signal "MODE [1:0]" performed by the sequence control unit 113.

FIG. 17 is an example of a flowchart for switching the oversampling interval of the oversampling circuit.

As shown in the figure, the data selection signal "MODE" is set to be 0 (MODE=0), so that the phase selection unit 106 selects dd3 and dd4 as output signals to the phase control unit 107. The phase control unit 107 generates a bias such that the phase difference between the input signals dd3 and dd4 becomes 100 ps in step S1.

The delay bias signal "db" generated by the delay bias generation unit 101-3 is supplied to the lock detection unit 114, so that the lock detection unit 114 detects that the signal is stabilized. At this time, the delay amount per one stage of the data delay element 102 becomes 100 ps in step S1-1.

When the data rate is 10 Gbps (Yes in step S2), the operation switching signal "MODE" is set to be 1 (MODE=1), so that the phase selection unit 106 selects dd0 and dd8 as output signals to the phase control unit 107. The phase control unit 107 generates a bias such that the phase difference between the input signals dd0 and dd8 becomes 100 ps in step S3.

The delay bias signal "db" generated by the delay bias generation unit 101-3 is supplied to the lock detection unit 114, so that the lock detection unit 114 detects that the signal is stabilized. At this time, the delay amount per one stage of the data delay element 102 becomes 112.5 ps. When the data rate is 10 Gbps, the process ends at this step in step S3-1.

When the data rate is not 10 Gbps (No in step S2), that is, when the data rate is 5 Gbps or 2.5 Gbps, the operation switching signal MODE is set to be 2 (MODE-2). At this time, the phase selection unit 106 selects dd2 and dd6 as output signals to the phase control unit 107. The phase control unit 107 generates a bias such that the phase difference between the input signals dd2 and dd6 becomes 100 ps in step S4.

The delay bias signal "db" generated by the delay bias generation unit 101-3 is supplied to the lock detection unit 114, so that the lock detection unit 114 detects that the signal is stabilized. At this time, the delay amount per one stage of the data delay element 102 becomes 125 ps (Yes in step S4-1). When the data rate is 5 Gbps, the process ends at this state (Yes in step S5).

As next operation of step S5, when the data rate is not 5 Gbps, that is, when the data rate is 2.5 Gbps, the operation switching signal "MODE" is set to be 3 (MODE=3). At this time, the phase selection unit 106 selects dd1 and dd7 as output signals to the phase control unit 107. The phase control unit 107 generates a bias such that the phase difference between the input signals dd1 and dd7 becomes 100 ps in step S6.

The delay bias signal "db" generated by the delay bias generation unit 101-3 is supplied to the lock detection unit 114, so that the lock detection unit 114 detects that the signal is stabilized. At this time, the delay amount per one stage of the data delay element 102 becomes 150 ps (Yes in step S6-1).

According to the above-mentioned procedure, by managing the initial phase difference of the data delay element 102 so as to control operation of the phase control unit 107, it becomes possible to stably generate a desired data delay amount without the phase difference being pseudo-locked at 270 degrees and to switch between data delay amounts properly.

According to the third embodiment, the multiphase serial data is generated by delaying the serial data by a predetermined time TD, and the multiphase serial data is oversampled using the multiphase clock of the phase difference Tck, so that the oversampling interval Tovs can be set to be a difference (Tovs=TD−N×Tck, N is an integer) between the delay time TD of the serial data and an integral multiple of the phase difference Tck of the multiphase clock. TD can be represented as the following equation (7).

$$TD=Tovs+N\times Tck=Tck(Tovs/Tck+N) \quad (7)$$

The following equation (8) can be obtained by normalizing, with TD, the change amount dTD of TD when Tovs changes by dTovs.

$$dTD/TD=dTovs/TD=dTovs/(Tovs+Tck) \quad (8)$$

Generally, since Tck is set to be larger than Tovs, the value of dTD/TD becomes small. Therefore the variation range of the delay amount of the data delay element required when switching the oversampling interval can be made small. Thus, the consumption power can be reduced, and the oversampling interval can be switched properly.

Figure 18:
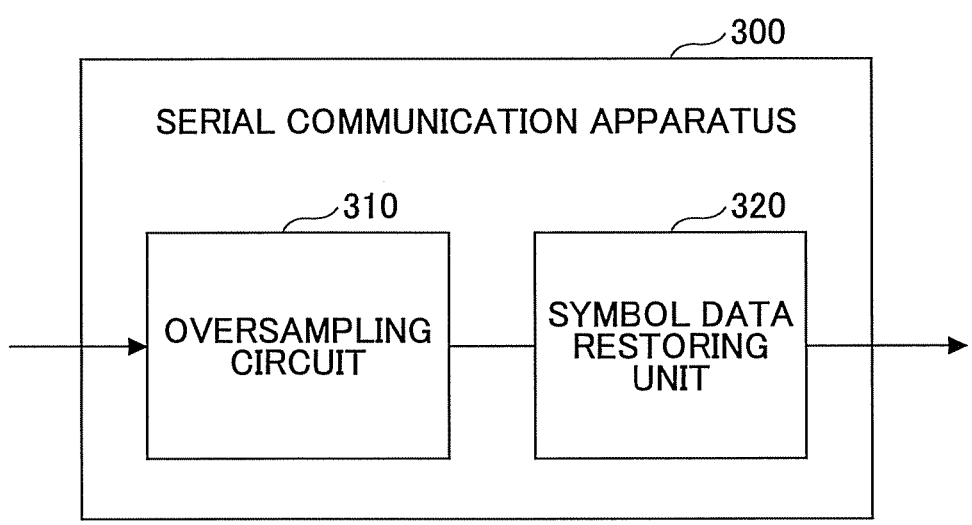
FIG. 18 is a block diagram showing a serial communication apparatus according to an embodiment of the present invention.

Each of the oversampling circuits in the embodiments can be used for a serial communication apparatus, for example. FIG. 18 shows an example of the serial communication apparatus 300. The serial communication apparatus 300 includes the oversampling circuit 310 of an embodiment of the present invention and a symbol data restoring unit 320 for restoring and outputting serial data.

The present invention is not limited to these embodiments, but various variations and modifications may be made without departing from the scope of the present invention.

What is claimed is:

1. An oversampling circuit comprising:
    a generation unit configured to generate multiphase serial data by delaying serial data by a predetermined time; and
    an oversampling unit configured to oversample the multiphase serial data by using multiphase clocks,
    wherein a phase difference of the multiphase serial data is set to be a sum of an oversampling interval used in the oversampling circuit and an integral multiple of a phase difference of the multiphase clocks.

2. The oversampling circuit as claimed in claim 1, the generation unit comprising a data delay unit that generates the multiphase serial data and that includes plural delay elements connected serially,
    wherein the phase difference of the multiphase serial data is set to be proportional to a difference of the number of delay elements through which serial data has passed.

3. The oversampling circuit as claimed in claim 1, wherein the phase difference of the multiphase serial data is set to be the same as the oversampling interval.

4. The oversampling circuit as claimed in claim 1, further comprising a unit configured to switch delay time of the multiphase serial data between at least two kinds of delay times.

5. The oversampling circuit as claimed in claim 4, further comprising a unit configured to gradually increase delay amount of the delay element for generating the delay time in order to switch the delay time of the multiphase serial data.

6. A serial communication apparatus comprising an oversampling circuit, the oversampling circuit comprising:
    a generation unit configured to generate multiphase serial data by delaying serial data by a predetermined time; and
    an oversampling unit configured to oversample the multiphase serial data by using multiphase clocks,
    wherein a phase difference of the multiphase serial data is set to be a sum of an oversampling interval used in the oversampling circuit and an integral multiple of a phase difference of the multiphase clocks.

7. An oversampling method performed by an oversampling circuit, the oversampling method comprising the steps of:
    generating multiphase serial data by delaying serial data by a predetermined time; and
    oversampling the multiphase serial data by using multiphase clocks,
    wherein a phase difference of the multiphase serial data is set to be a sum of an oversampling interval used in the oversampling circuit and an integral multiple of a phase difference of the multiphase clocks.

* * * * *